No. 831,798. PATENTED SEPT. 25, 1906.
E. MORTERUD.
VALVE AND MEANS FOR ACTUATING THE SAME.
APPLICATION FILED JAN. 10, 1901.
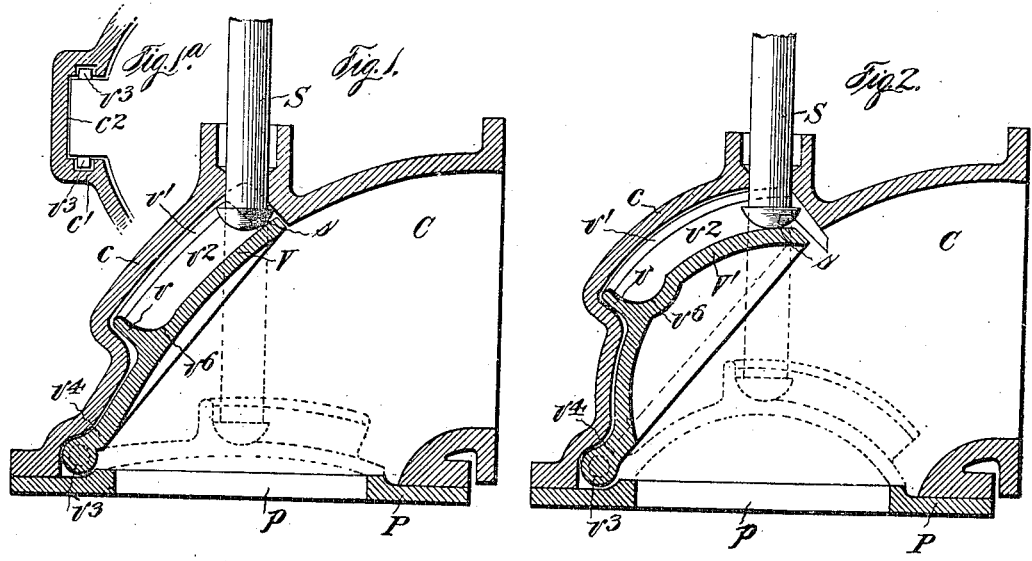
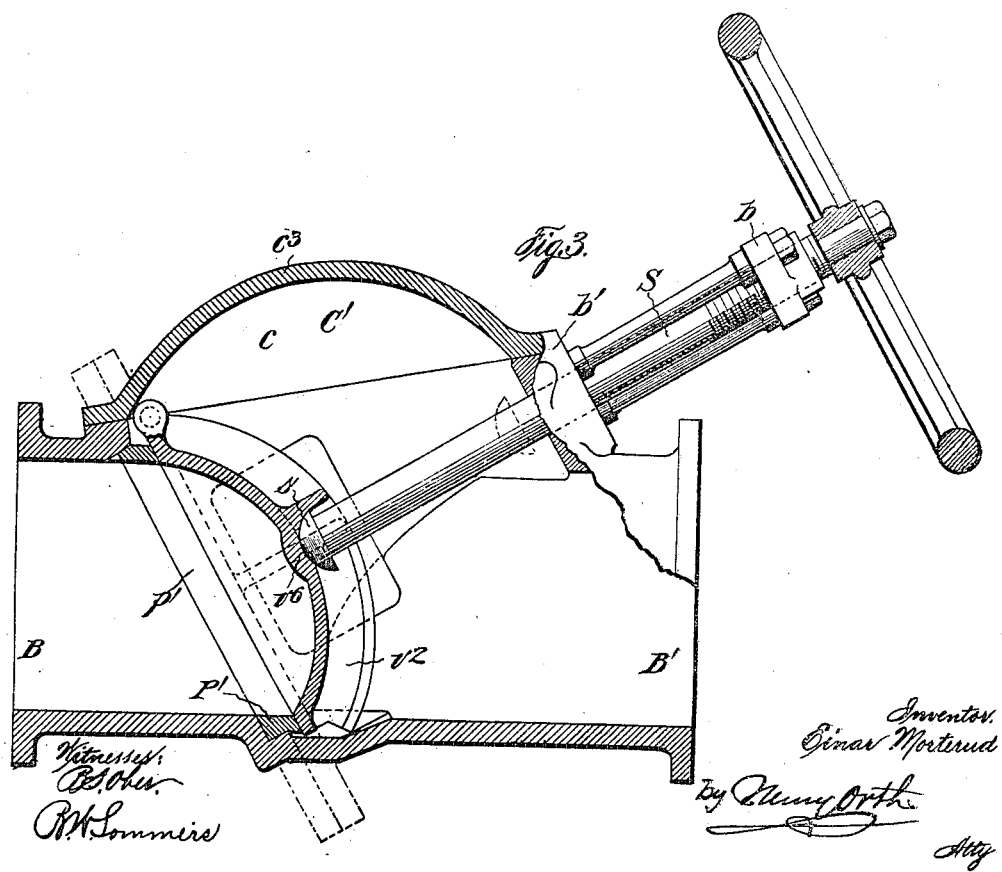

UNITED STATES PATENT OFFICE.

EINAR MORTERUD, OF KONGA, SWEDEN.

VALVE AND MEANS FOR ACTUATING THE SAME.

No. 831,798.　　　　　Specification of Letters Patent.　　　　Patented Sept. 25, 1906.

Application filed January 10, 1901. Serial No. 42,804.

*To all whom it may concern:*

Be it known that I, EINAR MORTERUD, a subject of the King of Sweden and Norway, residing at Konga, Sweden, have invented certain new and useful Improvements in Valves and Means for Actuating the Same, of which the following is a specification.

My invention has relation to valves, and more particularly to that type in which the valve is positively moved to and from its seat, or substantially so.

In valves of the type referred to as heretofore organized the valve moves either positively with its spindle to and from its seat or has a hinge connection with its seat and is so connected to its spindle as to move in an arc of a circle to and from its seat.

In those valves which have a hinge connection at the edge with the valve-seat or proximate thereto the spindle has heretofore been arranged parallel to the plane of the valve-seat and so connected to the valve as to turn on its hinge. On the other hand, in those valves which have their spindles perpendicular to the plane of the valve-seat and have a hinge connection with the casing the hinge has invariably been located at a point distant from the edge of the valve. In either construction the throw of the valve is very limited or the extent to which the spindle has to travel to open the valve fully is very great, generally greater than the diameter of the valve, in which case a valve-casing of a comparatively great internal area is necessary to admit of the accommodation and operation of the valve-actuating devices, very much greater than the superficial area of the valve itself, this being particularly the case when the valve has a hinge connection with its casing and the spindle is arranged perpendicular to the plane of the valve-seat.

My invention lies in the provision of means whereby the internal area of the valve-casing relatively to the superficial area or diameter of the valve and the extent of travel of the valve-spindle can be reduced to a minimum and whereby a clear passage is provided when the valve is fully open of a cross-sectional area equal to that of the inlet to and outlet from said passage.

A characteristic feature of my invention lies also in the arrangement of the valve-seat and valve whereby a valve-port of the same cross-sectional area as that of the valve-casing is obtained and whereby when the valve is fully open the pressure-face thereof will form a continuation of the valve-port edge, or substantially so; but that my invention may be fully understood I will describe the same in detail, reference being had to the accompanying drawings, in which—

Figure 1 is a vertical section of a valve-casing and valve embodying certain features of my invention. Fig. 1$^a$ is a sectional detail view of the pivotal connection between the edge of the valve and the casing. Fig. 2 is a view similar to Fig. 1, illustrating a slight modification; and Fig. 3 is a view similar to Fig. 1, illustrating a valve-casing adapted to be interposed in alined pipes.

As shown in Figs. 1 and 2, the valve-casing C is constructed for connection with two pipes at right angles to each other and provided with a recessed portion $c$ for the accommodation of a projection on the back of the valve V, having its seat on a seat-plate P. As shown, the pressure-face of the valve V is of such a curvature that when the valves are fully open said face will form a continuation of the inner proximate arcuate face of the valve-casing C, or substantially so. The valve V has formed on and diametrically across one-half its back an arcuate ridge or projection $v$, slotted longitudinally at $v'$ and provided with an internal guide groove or way $v^2$ for the reception and guidance of the suitably-enlarged and preferably convex head $s$ of the valve-spindle S, working, as usual, in a threaded bearing, not shown in Figs. 1 and 2; but in Fig. 3 I have shown a suitable bearing $b$, the spindle passing, as usual, through a stuffing-box $b'$.

As shown, the spindle S is arranged with its axis perpendicular to the plane of the valve-seat P and in the axial line of the port $p$ therein, while the valve V has a pivotal connection with its casing, which consists of journals $v^3$, formed on a projection $v^4$ at the edge of valve V opposite the projection $v$, above referred to, said journals seating in semicircular or half bearings $c'$, formed in a recess $c^2$ of casing C, as more clearly shown in Fig. 1$^a$, the vertical depth of the recess being such as to allow the valve V to bodily move a short distance off its seat, whereby a more reliable seating of the valve under the action of its spindle is obtained. In the construction described the distance the spindle has to move to fully open and close the valve is equal to about seventy-five per cent. of the diameter of the valve-controlled port.

The arrangement shown in Fig. 2 is substantially similar to that described in relation to Fig. 1, except that the valve V' is so arranged as to have the greatest possible practical throw, the distance the spindle has to travel to fully open and close the valve being then only about sixty-two per cent. of the diameter of the valve-controlled port. It is obvious that if the throw of the valve were increased a proper action of the spindle thereon could not be obtained.

In Fig. 3 I have shown the valve-casing C' as provided with a circular recess, in which the valve-seat P' is seated at an angle to the longitudinal axis of the casing, so that its port edges will be in line with the inner walls of the inlet and outlet branches B and B', whereby the cross-sectional area of the port $p'$ in said valve-seat will be slightly greater than the like internal area of said branches, while the recessed portion $c$ of the casing is here formed by a concavo-convex cover-plate $c^3$. The valve-casing C' may be made in two parts, each provided with suitable bolt-flanges, as shown in dotted lines, in which case the cover-plate $c^3$ can be dispensed with, the recess being then formed integral with one of the casing-sections and ready access afforded to the valve and its seat.

In the construction shown in Figs. 1, 2, and 3 I preferably form at the inner end of the bottom of the guideway $v^2$ a depression $v^6$, fitting the head $s$ of the spindle S, which depression when the valve is on its seat is coaxial therewith, and whereby a more extended bearing-surface is provided for said head to firmly hold the valve to its seat.

I claim—

1. A valve-casing, a valve-seat therein, a valve-actuating spindle movable in a plane perpendicular to said valve-seat and coaxial with its port, and a valve pivotally connected to the casing and having on its back an arcuate guideway in engagement with the spindle to cause the valve to rotate about its pivotal connection and slide on the spindle in an arc of a circle to or from its seat.

2. A valve-casing, a valve-seat therein, a valve-actuating spindle having motion in a plane perpendicular to the valve-seat and coaxial with its port, and a valve pivotally connected to the casing at one edge, said valve having on its back an arcuate guideway extending approximately from the edge diametrically opposite the pivotal connection to the center of the said valve, said guideway recessed at the latter point to receive the end of the valve-spindle, whereby the valve is free to rotate about its pivotal connection and move along the spindle in an arc of a circle to and from its seat and when on its seat prevented from sliding on the spindle.

3. A valve-casing, a valve-seat therein, a valve-actuating spindle having motion in a plane perpendicular to said seat and coaxial with its port, and a valve pivotally connected to the casing so as to have motion also in a plane perpendicular to its seat, said valve having on its back an arcuate guideway slidably connected to the valve-spindle, substantially as and for the purposes set forth.

In witness whereof I have hereunto set my hand in presence of two witnesses.

EINAR MORTERUD.

Witnesses:
M. ALGER,
AUGUST OLSEN.